(12) United States Patent
Alekseev et al.

(10) Patent No.: US 9,435,229 B2
(45) Date of Patent: Sep. 6, 2016

(54) PROCESS AND DEVICE FOR AIR SEPARATION AND STEAM GENERATION IN A COMBINED SYSTEM

(71) Applicant: LINDE AG, Pullach (DE)

(72) Inventors: Alexander Alekseev, Wolfratshausen (DE); Dimitri Goloubev, Munich (DE)

(73) Assignee: LINDE AG, Pullach (DE)

( * ) Notice: Subject to any disclaimer, the term of this patent is extended or adjusted under 35 U.S.C. 154(b) by 125 days.

(21) Appl. No.: 13/750,015

(22) Filed: Jan. 25, 2013

(65) Prior Publication Data

US 2013/0192228 A1    Aug. 1, 2013

(30) Foreign Application Priority Data

Jan. 26, 2012   (DE) .................. 10 2012 001 606
Apr. 5, 2012    (EP) ...................... 12002470

(51) Int. Cl.
*F01K 23/02*    (2006.01)
*F01K 25/00*    (2006.01)
(Continued)

(52) U.S. Cl.
CPC ............. *F01K 25/00* (2013.01); *F01K 23/068* (2013.01); *F04D 29/5826* (2013.01); *F25J 3/04018* (2013.01); *F25J 3/04157* (2013.01); *F25J 3/04169* (2013.01); *F25J 3/04181* (2013.01); *F25J 3/04581* (2013.01);
(Continued)

(58) Field of Classification Search
CPC .. F01K 23/068; F01K 25/00; F04D 29/5826; F04D 29/5833; F25J 3/04012; F25J 3/04018; F25J 3/04157; F25J 3/04521; F25J 3/04612; F25J 3/04618; F25J 2205/32; F25J 2230/04; F25J 2230/06; F25J 2240/70

USPC .................................................... 60/643–684
See application file for complete search history.

(56) References Cited

U.S. PATENT DOCUMENTS 5,386,685 A * 2/1995 Frutschi .......................... 60/783
5,406,786 A * 4/1995 Scharpf et al. ................. 60/775
(Continued)

FOREIGN PATENT DOCUMENTS

DE    39 08 505    9/1989
EP    0 829 691    3/1998
(Continued)

OTHER PUBLICATIONS

"Use of heat recovered from intercooled air compressor to pre-heat boiler feed water," Ip.com Journal, Sep. 17, 2008.
(Continued)

*Primary Examiner* — Thomas Denion
*Assistant Examiner* — Laert Dounis
(74) *Attorney, Agent, or Firm* — Millen, White, Zelano, Branigan, P.C.

(57) ABSTRACT

The disclosed process and apparatus provide for air separation and steam generation in a combined system that comprises a steam system (10) and an air separation plant (9), wherein a feed air stream (1) is introduced into a multistage air compression system (101, 102, 103) having n stages (n>=3) and compressed to a first high pressure that is equal to the final pressure of the air compression system, and, at this final pressure, is introduced (8) into the air separation plant (9). An intercooler is arranged between an i-th stage (102) (1<=i<n) and an i+1-th stage (103) of the air compression system; there, the feed air stream (4) is cooled in indirect heat exchange with a feed water stream (11).

22 Claims, 2 Drawing Sheets

(51) Int. Cl.
*F04D 29/58* (2006.01)
*F25J 3/04* (2006.01)
*F01K 23/06* (2006.01)

(52) U.S. Cl.
CPC ........ *F25J 3/04618* (2013.01); *F25J 2205/32* (2013.01); *F25J 2205/34* (2013.01); *F25J 2205/62* (2013.01); *F25J 2205/70* (2013.01); *F25J 2230/04* (2013.01); *F25J 2230/06* (2013.01); *F25J 2240/70* (2013.01); *Y02E 20/14* (2013.01); *Y02E 20/16* (2013.01); *Y02E 20/18* (2013.01)

(56) References Cited

U.S. PATENT DOCUMENTS

| | | | | |
|---|---|---|---|---|
| 5,669,237 | A | * | 9/1997 | Voit ................................ 62/646 |
| 5,865,023 | A | * | 2/1999 | Sorensen et al. ............... 60/775 |
| 5,921,106 | A | | 7/1999 | Girault et al. |
| 6,117,916 | A | * | 9/2000 | Allam et al. .................. 518/702 |
| 6,223,523 | B1 | * | 5/2001 | Frutschi ......................... 60/775 |
| 6,295,838 | B1 | | 10/2001 | Shah et al. |
| 6,305,191 | B1 | * | 10/2001 | Higginbotham ............... 62/646 |
| 8,720,203 | B2 | * | 5/2014 | Sasanuma et al. ............. 60/653 |
| 2001/0015069 | A1 | * | 8/2001 | Miura et al. ................... 62/50.2 |
| 2003/0033832 | A1 | * | 2/2003 | Massimo et al. .............. 62/643 |
| 2004/0074850 | A1 | * | 4/2004 | Kelly ............................ 210/806 |
| 2007/0280400 | A1 | * | 12/2007 | Keller ........................... 376/317 |
| 2009/0100864 | A1 | * | 4/2009 | Den Held et al. ............. 62/643 |
| 2010/0096115 | A1 | * | 4/2010 | Erickson ....................... 165/156 |
| 2010/0170285 | A1 | * | 7/2010 | Wallace et al. ................ 62/401 |
| 2011/0214452 | A1 | | 9/2011 | Dubettier-Grenier et al. |
| 2012/0131921 | A1 | * | 5/2012 | Held .............................. 60/671 |
| 2012/0174622 | A1 | * | 7/2012 | Granier ......................... 62/617 |

FOREIGN PATENT DOCUMENTS

| | | | |
|---|---|---|---|
| EP | 0 930 268 | | 7/1999 |
| FR | 1 281 075 | | 1/1962 |
| FR | 2827186 A1 | * | 1/2003 ............. B01D 3/32 |
| WO | WO-2010 052437 | | 5/2010 |

OTHER PUBLICATIONS

English Electric Company Limited, "Installation of compressor driven by steam turbine," STN Easy, Publication Date: Jan. 8, 1962; English Abstract of FR-1 281 075.

European Search Report for EP-12002470 dated Jul. 31, 2012.

Voest Alpine Ind Anlagen, "Process for producing liquid pig iron in a smelting gasifier," Espacenet, Publication Date: Sep. 28, 1989; English Abstract of DE-3908505.

* cited by examiner

PROCESS AND DEVICE FOR AIR SEPARATION AND STEAM GENERATION IN A COMBINED SYSTEM

SUMMARY OF THE INVENTION

The invention relates to a process for air separation and steam generation in a combined system comprising a steam system and an air separation plant. In the combined system, a feed air stream is introduced into a multistage air compression system having at least three stages. At least a first part of the feed air stream is compressed to a first high pressure, equal to the final pressure of the air compression system, and, at this final pressure, is introduced into the air separation plant. The feed air stream is taken off at an outlet temperature Tout(i) from a stage of the air compression system and introduced at this temperature into an intercooler which is arranged between an i-th stage ($1<=i<n$) and the following i+1-th stage of the air compression system. The feed air stream is cooled in the intercooler by indirect heat exchange with a first heat carrier stream. Heat from the first heat carrier stream heated in the intercooler is coupled into the steam system. Feed air stream is taken off from the preceding i−1-th stage of the air compression system and introduced without intercooling into the i-th stage of the air compression system.

An air separation plant can be constructed as a low-temperature air separation plant, as a membrane plant (on the basis of polymer membranes or ceramic high-temperature membranes) or as an adsorption plant. In each case, the feed air must first be compressed in an air compression system. In the case of a low-temperature air separation plant, the "air separation plant" comprises a main heat exchange system for cooling the feed air against return streams, one or more turbines, one or more separation columns and the condenser or condensers associated with the separation columns.

The word "steam" here always refers to process steam, that is to say high-pressure water vapor that is used as an energy source, in particular in one or more steam turbines. A specific example of a steam system is a steam power plant that generates electrical energy with the aid of one or more steam turbines. In this case, the air separation plant can supply the steam power plant with, for example, oxygen, for combustion of a fuel in an oxyfuel or oxycoal process.

A "stage" of an air compression system can also be formed by a machine having a single compressor wheel in a separate housing and having a separate drive. Alternatively, a stage is formed by a compressor wheel of a combined machine having a shared drive for a plurality of stages, wherein the machine optionally comprises a shared housing for these stages. Also, a combination of said machine types is possible in order to achieve an air compression system.

The transfer of heat of compression of the air compressor of an air separation plant to feed water of a steam system is known from EP 930268 A2, U.S. Pat. No. 4,461,154 and WO 2010/052437 (US 2011/0214452). Here, in each case, completely adiabatic air compressors are used that is to say, any intercooling is dispensed with. Although adiabatic air compressors deliver a high outlet temperature, their efficiency is relatively low and they consume a relatively large amount of energy. The feed water itself is used as "first heat carrier stream". The "coupling in of the heat" from the heated first heat carrier stream to the steam system is achieved here by feeding in the first heat carrier stream as feed water into the steam system.

In addition, IPCOM000174664D discloses a compression system in which two coolers are series-connected on the heat carrier side.

In the context of the invention, the first heat carrier stream can be used directly as feed water. Alternatively, the heat from the heated first heat carrier stream can be coupled by simple or multiple indirect heat exchange into the steam system, for example in a heat exchanger, in which the first heat carrier stream is passed in indirect counterflow to a feed water stream of the steam system.

Thus, one aspect of the invention is to achieve favorable use of the heat of compression of the air compressor with a relatively low energy consumption of the compressor.

Upon further study of the specification and appended claims, other aspects and advantages of the invention will become apparent.

These aspects are achieved by introducing the feed air stream into a further cooler, downstream of the intercooler and upstream of the last stage of the air compression system, introducing at least a first part of the feed air stream into an aftercooler, downstream of the last stage of the air compression system, where it is cooled in indirect heat exchange with a second heat carrier stream, and forming at least a part of the first heat carrier stream, that is introduced into the intercooler, from at least a part of the second heat carrier heated in the aftercooler.

In the invention, between two stages (the i-th and the i+1-th) an intercooler is used, but no intercooler is used between the prior two stages in the series (the i−1th and i-th). (For example, stages 1 to i−1 can be completely without cooling, for instance if the stages 1 to i−1 are implemented by a plurality of stages of an axial compressor or by a plurality of axial stages of a combined axial-radial compressor). As a result, at the i-th stage, an outlet temperature Tout(i) of the air is reached, which is markedly higher than the temperature that would be reached in an isothermal compression system in which an intercooler is arranged between each pair of stages. This increased air temperature Tout(i) is available in the invention at the intake of the intercooler for heating the first heat carrier stream.

This outlet temperature is lower than that of a comparable adiabatic compressor, with which, also, correspondingly less heat is available for heating the first heat carrier stream. However, in the context of the invention, it has proved that owing to the targeted dispensing with one or more individual intercoolers, the outlet temperature of the air compressor can be adjusted to be sufficiently high that rational utilization of the waste heat of the feed water preheating is possible, at the same time the efficiency of the air compressor decreases only moderately and, in particular, is markedly higher than that of an adiabatic compressor.

In comparison with a customary intercooled (isothermal) air compressor, the waste heat can be transferred to a higher temperature level than the first heat carrier stream. The corresponding heat flow rate and temperature can be optimized with simultaneous minimization of the drive power of the compressor.

The at least two series-connected compressor stages without intercooling permit an efficient heating up of feed water (or of water from an intercooled circuit for heating up of the feed water) up to temperatures of 125 to 140° C. (or else higher). The heating up of the water (or of the heat carrier of the intercooled circuit) in this case takes place in a heat exchanger (the "intercooler"), in which the water stream is heated up and the air stream that is compressed in at least two stages is cooled. In contrast to the case with conventional intercoolers or aftercoolers, the heat in this case is transferred with a substantially lower mean temperature difference. This is, for example, 5 to 20 K, preferably 7 to 12 K.

The first heat carrier stream that is heated in the first aftercooler is introduced into the steam system. In the steam system it is either directly used as feed water in the steam boiler, or alternatively it serves for indirect heating of feed water. In the latter case, the "first heat carrier stream" can also be formed by a fluid other than water.

The use of the process according to the invention is particularly expedient in the case of steam power plants, when, therefore, the steam system is formed by a steam power plant.

Two groups of steam power plant processes are known which simultaneously serve for energy and $CO_2$ production from hydrocarbonaceous fuels (coal, natural gas, petroleum etc.) and contain an air separation plant, IGCC processes and oxyfuel processes. These processes can be used both primarily for energy production with $CO_2$ separation as a by-product, and primarily for producing $CO_2$ or $CO_2$-containing fluids, with electrical energy as a by-product.

In an oxyfuel process, the fuel is not burnt with air, but with oxygen or an oxygen-rich gas that is supplied from an air separation plant.

In an IGCC process (Integrated Gasification Combined Cycle), liquid or solid fuel is first converted in a gasifier into synthesis gas, which principally consists of CO and $H_2$. This gas is thereafter further chemically converted with use of hydrogen, and from CO and $H_2O$, then $H_2$ and $CO_2$ (shift reaction) are formed, and the $CO_2$ is separated off. Combustible gases from the gasification and shift reaction are used for energy production in a combined cycle gas and steam cogeneration process. In this case they are burnt in a gas turbine, exhaust gas from the gas turbine is passed via a waste-heat boiler in which the flue gas heat is transferred to the steam circuit. For operating the gasifier, oxygen and nitrogen are used; nitrogen can, in addition, be used for diluting combustible hydrogenous substances prior to entry into the gas turbine. These gases are generated in an air separation plant.

The energy efficiency of IGCC or oxyfuel processes can be improved by the integration according to the invention of air compressor waste heat into the steam circuit. The hot air (or a part of the air) after the compression (in one or more stages of the air compressor) in this case is passed through a counterflow or crossflow heat exchanger in order to transfer the heat to a fluid (the "first heat carrier stream") which is likewise passed through this heat exchanger. The air is cooled in this heat exchanger and the fluid heated.

The fluid used is the feed water (or a part of the feed water) from the steam circuit or another heat carrier fluid that releases heat to the steam circuit. The air compressor waste heat is thus directly integrated into the steam circuit. This integration of the air compressor waste heat into the steam circuit leads to the energy production of the steam circuit being increased.

In the context of the invention, the feed air stream is introduced into a further cooler downstream of the intercooler and upstream of the last stage of the air compression system in which the feed air stream is cooled: the further cooler can be constructed, for example, as a direct contact cooler in which the cooling is carried out by direct heat exchange with cooling water. By this means, firstly the temperature at the outlet of the intercooler can be kept relatively high, and thereby adapted to the temperature of the incoming first heat carrier stream. Secondly, a low intake temperature into the last stage results, which makes the operation thereof more efficient.

Furthermore, an aftercooler is used, in that the feed air stream—or when a part is branched off upstream of the last stage, its first part—is introduced downstream of the last stage of the air compression system into an aftercooler and there is cooled in indirect heat exchange with a second heat carrier stream. In this aftercooler, a further part of the heat of compression of the air compressor can be recovered.

Preferably, in this case, at least a part of the second heat carrier stream heated in the aftercooler forms at least a part of the first heat carrier stream that is introduced into the intercooler; the aftercooler and the intercooler are therefore series-connected on the heat carrier side. The first heat carrier stream is thereby available at an elevated temperature even upstream of the intercooler. Therefore, the heat of compression recovered in the aftercooler can also be utilized for the feed water preheating and can be used profitably in the steam system. Via the water-side series connection of the aftercooler and the intercooler, at least the waste heat which is removed in these two coolers is made available to the steam system in the form of preheated feed water or a heated up first heat carrier stream.

In particular, the air compression system is formed by a single multistage air compressor having n stages.

"Multistage air compressor" here means an integrated machine in which all stages are seated on the same drive shaft or are connected to the same gear.

Alternatively, the air compression system can comprise at least two air compressors, namely one main air compressor and an aftercompressor, wherein the last stage of the air compression system is formed by the aftercompressor.

The intercooler of the air compression system can then be arranged downstream of the last stage of the main air compressor; alternatively, the intercooler is situated between two stages of the main air compressor. In general, the aftercompressor is constructed as a single stage; in principle, however, a two- or multistage aftercompressor is also usable with or without intercooling.

The outlet temperature Tout(i) at which the feed air exits from the i-th stage of the air compression system is between 120 and 200° C., preferably between 130 and 170° C. Temperatures in the first heat carrier stream of, for example, 125 to 140° C. may thereby be achieved.

In many cases it is expedient if a second part of the feed air stream is taken off from the air compression system at a second, medium pressure which is lower than the first, high pressure, wherein the second part is branched off from the feed air stream downstream of the intercooler or downstream of the direct contact cooler. The medium-pressure air ("second part") is therefore compressed in the first stages together with the high-pressure air ("first part") but taken off from the air compression system upstream of the last stage at the second, medium pressure. The medium-pressure air can likewise be introduced into the air separation plant or utilized for other purposes.

For example, in efficient air separation processes for producing low-pressure impure oxygen for steam power plants under Oxyfuel processes, generally, two feed air streams at different pressures are required (high-pressure air=first part and medium-pressure air=second part). The two air streams can be provided using only one compressor (driven by an electric motor or a steam turbine). This is ensured in that at least one air stream is taken off still upstream of the last compressor stage, in particular immediately downstream of the intercooler or, if present, immediately downstream of the direct contact cooler.

Clearly, a third air part can similarly also be obtained at a third pressure level, in that this is compressed together with the first and second parts to an intermediate pressure of the air compression system and then branched off from the total air stream.

Not only the intercooler but also the aftercooler can be constructed as plate heat exchangers, in particular those made of steel, or else as tube-bundle heat exchangers using straight tubes which are operated in crosscounterflow. However, it is more expedient if the intercooler or the aftercooler or both are constructed as helically coiled tube-bundle heat exchangers.

"Helically coiled tube-bundle heat exchanger" here describes a heat exchanger in which at least two tube bundles of helically coiled tubes are arranged one inside the other. Such heat exchangers are operated in crosscounterflow and are described, for example, in the monograph "Tieftemperaturtechnik" [Low-temperature technology] by Hausen and Linde, 1985 on pages 471 to 473. The tubes can have fins internally, externally, or on both sides. The fluid (water) that is to be heated up is passed through the tubes which are coiled onto a core. The compressed air that is to be cooled flows in the outer space between the tubes, the core and the vessel shell. FIG. 1 herein corresponds to FIG. 9.2 at page 472 of the Hausen and Linde monograph (1985) and shows a helically coiled tube-bundle heat exchanger providing heat exchange between a heat exchange medium and three other fluids.

The demands made of coolers for air are very high. Firstly, the amount of heat to be transferred is rather large (corresponds to roughly the compressor output), secondly, efforts are made to keep the temperature difference in this air-water heat exchanger as small as possible (<20K) in order to minimize losses. Large pressure drops on the air side must not form, the heat exchanger must manage with high temperatures of up to 200° C. and the corresponding thermal stresses, and it must be cost efficient.

The conventional tube-bundle heat exchangers (TEMA heat exchangers) customarily used as air coolers are not optimally suitable for this object, since they function rather as cross heat exchangers and therefore are operated with markedly larger temperature differences. Furthermore, they are not particularly compact. The very efficient and compact aluminum-plate-fin heat exchangers typical for the low-temperature part of an air separation plant are problematic because of high operating temperatures.

The helically coiled crosscounterflow heat exchangers are robust. They can be used at the relatively high temperatures required here and are insensitive to the thermal stresses. In addition, they are compact and efficient apparatuses, therefore give rise to moderate costs and can operate at temperature differences of less than 10 K.

Such helically coiled tube-bundle heat exchangers can be used not only in the process and device according to the invention, but generally for cooling compressed air against a heat carrier stream that is to be heated up. A further possibility for use is, for example, in the use of a helically coiled tube-bundle heat exchanger as aftercooler of an adiabatic air compressor.

In principle, helically coiled tube-bundle heat exchangers can also be used in any other process as intercooler and/or aftercooler of an air compression system.

Preferably, the first and second heat carrier streams are formed by a water stream.

The invention further relates to an apparatus which is an integrated device for air separation and steam generation with a combined system that comprises a steam system and an air separation plant, the apparatus comprising:

a multistage air compression system having n stages (n>=3) for compressing a feed air stream to a first, high pressure that is equal to the final pressure of the air compression system, means for introducing the compressed feed air stream at this final pressure into the air separation plant, means for taking off the feed air stream at an outlet temperature Tout(i) from a stage of the air compression system and for introducing it at this temperature into an intercooler which is arranged between an i-th stage (1<=i<n) and the following i+1-th stage of the air compression system, wherein the intercooler is constructed for cooling the feed air stream in indirect heat exchange with a first heat carrier stream, means for coupling heat from the first heat carrier stream heated in the intercooler into the steam system, means for taking off the feed air stream from the preceding i–1-th stage of the air compression system for introduction without intercooling into the i-th stage of the air compression system, means for introducing the feed air stream into a further cooler downstream of the intercooler and upstream of the last stage of the air compression system, means for introducing at least a first part of the feed air stream into an aftercooler downstream of the last stage of the air compression system, which aftercooler is constructed for cooling by indirect heat exchange with a second heat carrier stream, and means for introducing at least a part of the second heat carrier stream heated in the aftercooler into the intercooler as first heat carrier stream.

The device according to the invention can be supplemented singly or in combination by device features which correspond to the features of the above-described process.

BRIEF DESCRIPTION OF THE DRAWINGS

Further advantages, features and details of the present invention shall be described in the following with reference to the Figures, wherein.

Figure 1:
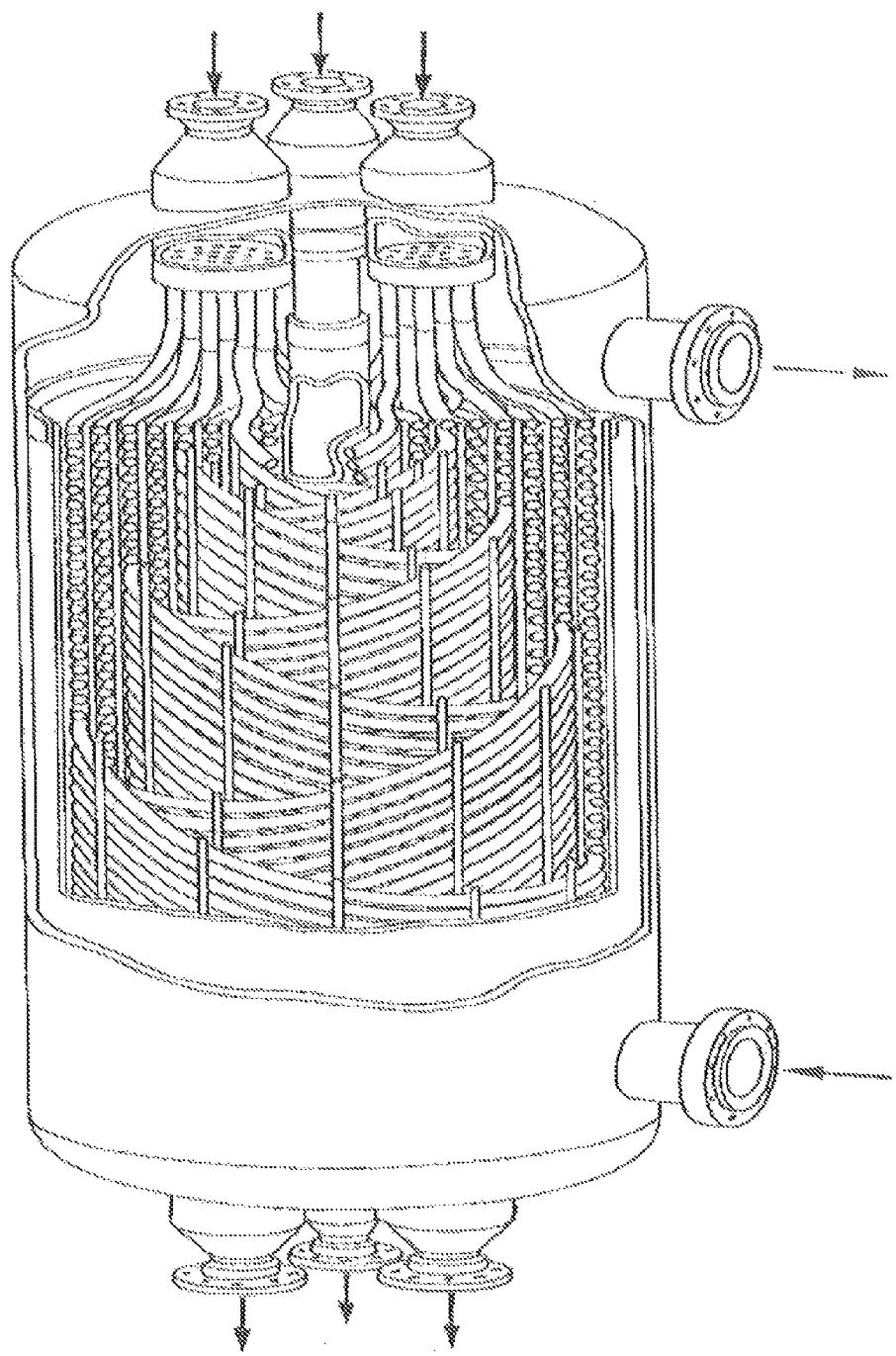
FIG. 1 shows a helically coiled tube-bundle heat exchanger as known in the art (corresponds to FIG. 9.2 at page 472 of the Hausen and Linde monograph (1985))
Figure 2:
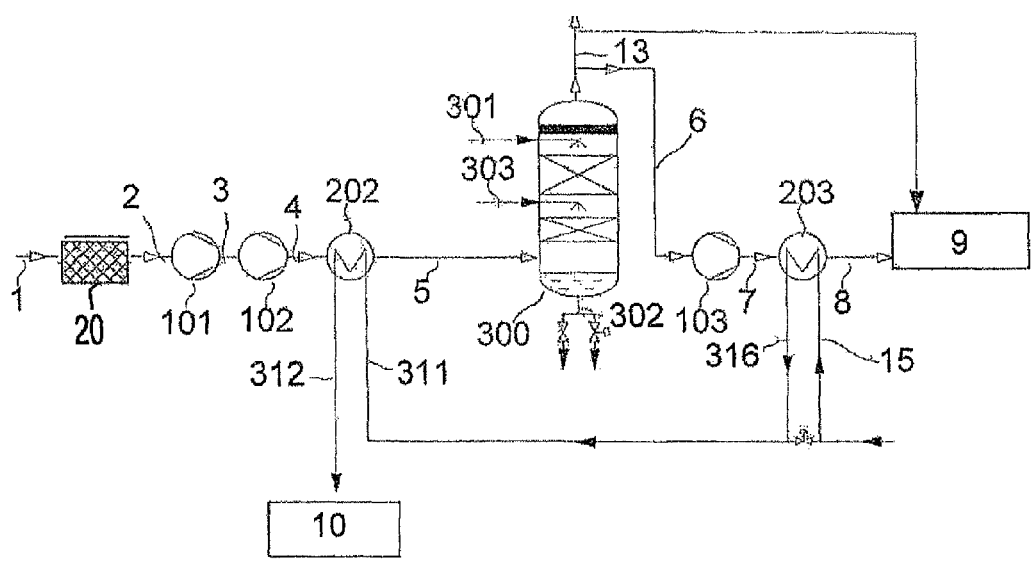
FIG. 2 shows an exemplary embodiment of the process according to the invention.

The exemplary embodiment relates to a three-stage air compression system having the stages 101, 102 and 103 (n=3). In the sense of the patent claims, the second stage 102 is the "i-th" stage, the first stage 101 is the "i–1-th" stage. In both exemplary embodiments, the air compressor has an intercooler 202 and an aftercooler 203. The combined system has an air separation plant 9 and a steam system 10. The steam system 10 is formed by a steam power plant. The air separation plant is constructed here as a low-temperature air separation plant. The air separation plant 9 generates an oxygen-enriched product stream which is introduced into the combustion chamber of the steam power plant 10 (which is not shown in the drawings).

Atmospheric air 1, 2 is drawn in via a filter 20 as "feed air stream" at 1.01 bar and 300 K from the first stage 101. The feed air stream 3 exiting from the first stage is passed directly, that is to say without cooling, to the second stage 102 and there further compressed to a "second, medium pressure" of 3.0 to 3.8 bar. The feed air stream 4, downstream of the second stage 102, is cooled in the intercooler 202. At least a first part 6 of the feed air stream 5, downstream of the intercooler 202, is compressed in the third and last stage 103 of the air compression system further to a final pressure (the "first, high pressure") of 4.8 to 5.5 bar. The high-pressure air 7 is cooled in the aftercooler 203. The feed air stream (or the first part of the feed air stream) 8 is introduced into the air separation plant 9 downstream of the aftercooler 203.

The intercooler 202 is operated using a first heat carrier stream 311 as coolant which enters at a temperature of 315 to 340 K. This is heated in the first intercooler 202 by indirect heat exchange with the feed air stream to about 395 to 435 K. The heated first heat carrier stream 312 is introduced into the steam power plant 10 and there serves for generating process steam, either by direct use as feed water or by indirect heat exchange with the feed water which is introduced into the steam boiler.

The first heat carrier stream preferably enters into the intercooler 202 at a relatively low pressure of less than 20 bar, preferably less than 10 bar. The "pumping up" of the water stream to a higher pressure preferably proceeds downstream of the heat exchanger (not shown in the drawing).

The aftercooler 203 is cooled by a second heat carrier stream 15 which has a temperature of 290 to 310 K. In the exemplary embodiment, the first and second heat carrier streams (311, 15) are formed by a water stream.

The feed air 5, downstream of the intercooler 202, is brought in direct heat exchange with cooling water 301 in a further cooler, which is here designed as a direct contact cooler 300, and cooled in this case by 10 to 15 K. The cooling water 301 is formed, for example, by cold water from an evaporative cooler. From the bottom of the direct contact cooler 300, heated cooling water 302 is taken off.

The aftercooler 203 and the intercooler 202 are series-connected on the water side (heat carrier side), in that the heated water stream 316 from the aftercooler 203 forms the first heat carrier stream 311. The temperature of the heated second heat carrier stream 316 is 315 to 340 K. Here, the heat removal in the aftercooler must virtually be "shifted" to the direct contact cooler, that is to say the direct contact cooler 300 must remove more heat. For this purpose, here, in addition to the cold water introduction line 301, a conventional "hot" cooling water stream 303 is also introduced.

If required, a second part 13 of the feed air stream can be branched off from the feed air stream 5 as medium-pressure air immediately after the intercooler 202 or—as shown—immediately after the direct contact cooler 300, and fed separately to the air separation plant 9.

The exemplary embodiment can be implemented in two variants. In the first variant, the air compression system is formed by a single multistage air compressor having three stages. In a second variant, the air compression system has a two-stage main air compressor and an aftercompressor, wherein the last stage 103 of the air compression system is formed by the aftercompressor, and the first two stages 101, 102 by the main air compressor.

In a departure from the exemplary embodiment shown in the drawing, the invention can also be employed in a system having a four- or multistage air compression system.

In a departure from the independent claims, the first heat carrier stream can also be introduced in whole or in part into a system different from a steam system. In principle, the heat of the heated up first heat carrier can also be utilized in any other system that has a heat requirement at the matching temperature level. For example, this stream can be used for heating up regeneration gas for molecular sieve adsorbers (which serve, for instance, for purifying feed air for the or an air separation plant) or for heating up a process stream before expansion in a "hot" turbine in the meaning of the applicant's German patent application filed on Apr. 3, 2012 having the official application number 102012006746.1 (applicant's internal file number P12C036=IC0846) and the applications corresponding thereto. In this other system, also, the first heat carrier stream can either be used directly or the heat thereof can be coupled into the system by indirect heat exchange.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application No. DE 10 2012 001606.9, filed Jan. 26, 2012 and European patent application EP 12002470.8, filed Apr. 5, 2012, are incorporated by reference herein.

The invention claimed is:

1. An integrated process for air separation and steam generation in a combined system comprising a steam system (10) and an air separation plant (9), said process comprising:
   introducing a feed air stream (1) into a multistage air compression system (101, 102, 103) having n stages, wherein n is greater than or equal to 3, and at least a first part of the feed air stream is compressed to a first high pressure that is equal to the final pressure of the air compression system, and, at this final pressure, is introduced (8) into the air separation plant (9),
   removing the feed air stream (3) from an i−1-th stage (101) of the air compression system, wherein i is greater than 1 and i is less than n, and introducing the feed stream, without intercooling, into an i-th stage (102) of the air compression system,
   removing the feed air stream (4) at an outlet temperature Tout(i) from the i-th stage (102) of the air compression system and introducing the feed air stream at this temperature into an intercooler (202) which is arranged between said i-th stage (102) and the subsequent i+1-th stage (103) of the air compression system,
   cooling the feed air stream (4) in the intercooler (202) by indirect heat exchange with a heat carrier stream (311),
   coupling heat from the heat carrier stream (312) heated in the intercooler (202) into the steam system (10), wherein the heat carrier stream is used directly as feed water in the steam system or the heat of the heat carrier stream is coupled by indirect heat exchange into the steam system,
   introducing the feed air stream into a further cooler (300) positioned downstream of the intercooler and upstream of the last stage of the air compression system, and
   introducing at least said first part of the feed air stream (7) into an aftercooler (203) downstream of the last stage (103) of the air compression system, and cooling said first part of the feed air stream (7) in said aftercooler (203) by indirect heat exchange with said heat carrier stream (15) before introducing said first part of the feed air stream (8) into the air separation plant (9), and wherein said heat carrier stream (316), after being heated in said aftercooler (203), is introduced (311) into said intercooler (202).

2. The process according to claim 1, wherein said further cooler (300) is constructed as a direct contact cooler and the feed air stream is cooled in the direct contact cooler (300) by direct heat exchange with cooling water (301, 303).

3. The process according to claim 1, wherein the air compression system is formed by a single multistage air compressor having n stages.

4. The process according to claim 1, wherein the air compression system comprises at least two air compressors, namely one main air compressor and an aftercompressor, wherein the last stage of the air compression system is formed by the aftercompressor.

5. The process according to claim 1, wherein the outlet temperature Tout(i) of the feed air stream (4) from the i-th stage (102) of the air compression system is between 120 and 200° C.

6. The process according to claim 5, wherein the outlet temperature Tout(i) of the feed air stream (4) from the i-th stage (102) of the air compression system is between 130 and 170° C.

7. The process according to claim 1, wherein the heat carrier stream (311) is heated in the intercooler (202) to a temperature of 125 to 140° C.

8. The process according to claim 1, wherein a second part (13) of the feed air stream is removed from the air compression system at a second, medium pressure which is lower than the first, high pressure, wherein the second part is branched off from the feed air stream downstream of the intercooler (202) or downstream of the further cooler (300).

9. The process according to claim 1, wherein the intercooler (202) and/or the aftercooler (203) is constructed as a helically coiled tube-bundle heat exchanger.

10. The process according to claim 1, wherein the intercooler (202) and/or the aftercooler (203) is constructed as a plate heat exchanger.

11. The process according to claim 1, wherein the heat carrier stream (15) is formed by a water stream.

12. The process according to claim 1, wherein the steam system (10) is a steam power plant.

13. The process according to claim 12, wherein the steam power plant is an oxyfuel power plant or an integrated gasification combined cycle power plant.

14. An integrated apparatus for air separation and steam generation with a combined system, said apparatus comprising:

a steam system (10) and an air separation plant (9), a multistage air compression system (101, 102, 103) having n stages, wherein n is greater than or equal to 3 for compressing a feed air stream (1) to a first, high pressure that is equal to the final pressure of the air compression system, means for introducing (8) the compressed feed air stream at the final pressure into the air separation plant (9), means for removing the feed air stream (3) from an i-1-th stage (101) of the air compression system for introduction, without intercooling, into the i-th stage (102) of the air compression system, wherein i is greater than 1 and i is less than n, means for removing the feed air stream (4) at an outlet temperature Tout(i) from a stage (102) of the air compression system and means for introducing the feed air stream (4) at outlet temperature Tout(i) into an intercooler (202) which is arranged between said i-th stage (102) i+1-th stage (103) of the air compression system, wherein the intercooler (202) is constructed for cooling the feed air stream (4) by indirect heat exchange with a heat carrier stream (311), means for coupling heat from the heat carrier stream (312), heated in the intercooler (202), into the steam system (10), wherein the heat carrier stream is used directly as feed water in the steam system or the heat of the heat carrier stream is coupled by indirect heat exchange into the steam system, means for introducing the feed air stream into a further cooler (300) downstream of the intercooler and upstream of the last stage of the air compression system, means for introducing at least a first part of the feed air stream (7) into an aftercooler (203) downstream of the last stage (103) of the air compression system and before introduction of the first part of the feed air stream into the air separation plant (8), which aftercooler is constructed for cooling the at least the first part of the feed air stream by indirect heat exchange with the heat carrier stream (15), and means for introducing the heat carrier stream (316), after being heated in the aftercooler (203), into the intercooler (202).

15. An integrated process for air separation and steam generation in a combined system comprising a steam system (10) and an air separation plant (9), said process comprising:

introducing a feed air stream (1) into a multistage air compression system (101, 102, 103) having n stages, wherein n is greater than or equal to 3, and at least a first part of the feed air stream is compressed to a first high pressure that is equal to the final pressure of the air compression system, and, at this final pressure, is introduced (8) into the air separation plant (9), removing the feed air stream (3) from an i–1-th stage (101) of the air compression system, wherein i is greater than 1 and i is less than n, and introducing the feed stream, without intercooling, into an i-th stage (102) of the air compression system, removing the feed air stream (4) at an outlet temperature Tout(i) from the i-th stage (102) of the air compression system and introducing the feed air stream at this temperature into an intercooler (202) which is arranged between said i-th stage (102) and the subsequent i+1-th stage (103) of the air compression system, cooling the feed air stream (4) in the intercooler (202) by indirect heat exchange with a heat carrier stream (311), coupling heat from the heat carrier stream (312) heated in the intercooler (202) into the steam system (10), wherein the heat carrier stream is used directly as feed water in the steam system or the heat of the heat carrier stream is coupled by indirect heat exchange into the steam system, introducing the feed air stream into a further cooler (300) positioned downstream of the intercooler and upstream of the last stage of the air compression system, and introducing at least said first part of the feed air stream (7) into an aftercooler (203) downstream of the last stage (103) of the air compression system, and cooling said first part of the feed air stream (7) in said aftercooler (203) by indirect heat exchange with at least a part of said heat carrier stream (15) before introducing said first part of the feed air stream (8) into the air separation plant (9), wherein another part of said heat carrier stream (15) does not undergo indirect heat exchange in said aftercooler (203), wherein said at least part of said heat carrier stream (316), after being heated in said aftercooler (203), is introduced (311) into said intercooler (202), and said another part of said heat carrier stream (15) is combined with said at least a part of said heat carrier stream (316) before said heat carrier stream is introduced (311) into said intercooler (202).

16. An integrated apparatus for air separation and steam generation with a combined system, said apparatus comprising:

a steam system (10) and an air separation plant (9), a multistage air compression system (101, 102, 103) having n stages, wherein n is greater than or equal to 3 for compressing a feed air stream (1) to a first, high pressure that is equal to the final pressure of the air compression system, means for introducing (8) the compressed feed air stream at the final pressure into the air separation plant (9), means for removing the feed air stream (3) from an i−1-th stage (101) of the air compression system for introduction, without intercooling, into the i-th stage (102) of the air compression system, wherein i is greater than 1 and i is less than n, means for removing the feed air stream (4) at an outlet temperature Tout(i) from a stage (102) of the air compression system and means for introducing the feed air stream (4) at outlet temperature Tout(i) into an intercooler (202) which is arranged between said i-th stage (102) and the subsequent i+1-th stage (103) of the air compression system, wherein the intercooler (202) is constructed for cooling the feed air stream(4) by indirect heat exchange with a first heat carrier stream (311), means for coupling heat from a heat carrier stream (312), heated in the intercooler (202), into the steam system (10), wherein the heat carrier stream can be used directly as feed water in the steam system or the heat of the heat carrier stream can be coupled by indirect heat exchange into the steam system, means for introducing the feed air stream into a further cooler (300) downstream of the intercooler and upstream of the last stage of the air compression system, means for introducing at least a first part of the feed air stream (7) into an aftercooler (203) downstream of the last stage (103) of the air compression system and before introduction of the first part of the feed air stream into the air separation plant (8 , which aftercooler is constructed for cooling at least the first part of the feed air stream by indirect heat exchange with at least a part of the heat carrier stream (15), means for directing another part of the heat carrier stream (15) to bypass the indirect heat exchange in said aftercooler (203), means for introducing heat carrier stream (316), after being heated in the aftercooler (203), into the intercooler (202), and means for combining the another part of the heat carrier stream with the at least a part of the heat carrier stream (316) before the heat carrier stream is introduced (311) into said intercooler (202).

17. The process according to claim 1, wherein the heat transfer between the feed air stream (4) and the heat carrier stream (311) in the intercooler (202) is conducted at a mean temperature difference of 5 to 20 K.

18. The process according to claim 1, wherein a second part (13) of the feed air stream is removed from the air compression system at a second, medium pressure which is lower than the first, high pressure, wherein the second part is branched off from the feed air stream downstream of the further cooler (300) and upstream of the aftercooler (203).

19. The process according to claim 8, wherein said second part (13) of the feed air stream is removed from the air compression system upstream of the aftercooler (203).

20. The process according to claim 1, wherein the heat carrier stream (311) enters the intercooler (202) at a temperature of 315 to 340 K and is heated therein to 395 to 435 K.

21. The process according to claim 2, wherein cooling water (301, 303) is introduced into said direct contact cooler at two points that are vertically spaced from one another.

22. The process according to claim 1, wherein the heat carrier stream enters the aftercooler (203) at a temperature of 290 to 310 K and then enters the intercooler (202) at a temperature of 315 to 340 K and is heated in said intercooler (202) to 395 to 435 K.

* * * * *